(12) United States Patent
Lacoste et al.

(10) Patent No.: US 9,305,464 B2
(45) Date of Patent: Apr. 5, 2016

(54) PARKING ASSISTANCE SYSTEM, METHOD FOR OPERATING A PARKING ASSISTANCE SYSTEM, COMPUTER PROGRAM, COMPUTER-READABLE MEDIUM AND MOTOR VEHICLE

(71) Applicant: GM GLOBAL TECHNOLOGY OPERATIONS LLC, Detroit, MI (US)

(72) Inventors: Holger Lacoste, Nackenheim (DE); Stefan Bauer, Wiesbaden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 109 days.

(21) Appl. No.: 14/042,798

(22) Filed: Oct. 1, 2013

(65) Prior Publication Data
US 2014/0132424 A1    May 15, 2014

(30) Foreign Application Priority Data
Oct. 5, 2012  (DE) .................. 10 2012 019 510

(51) Int. Cl.
*B60Q 1/48*  (2006.01)
*G08G 1/14*  (2006.01)
*G08G 1/16*  (2006.01)
*B60T 7/22*  (2006.01)

(52) U.S. Cl.
CPC . *G08G 1/168* (2013.01); *B60T 7/22* (2013.01); *B60T 2201/10* (2013.01)

(58) Field of Classification Search
None
See application file for complete search history.

(56) References Cited

U.S. PATENT DOCUMENTS

| | | | | |
|---|---|---|---|---|
| 6,326,887 | B1 * | 12/2001 | Winner et al. | 340/435 |
| 6,856,874 | B2 * | 2/2005 | Weilkes et al. | 701/45 |
| 6,999,003 | B2 * | 2/2006 | Matsukawa et al. | 340/932.2 |
| 7,176,789 | B2 * | 2/2007 | Herder | 340/435 |
| 8,489,318 | B2 | 7/2013 | Reinisch et al. | |

FOREIGN PATENT DOCUMENTS

| | | |
|---|---|---|
| DE | 102009058544 A1 | 7/2010 |
| DE | 102009055649 A1 | 5/2011 |
| EP | 1522458 A2 | 4/2005 |
| WO | 2009141019 A1 | 11/2009 |

OTHER PUBLICATIONS

German Patent Office, German Patent Search Report for Application No. 102012019510.9, dated Jun. 7, 2013.

* cited by examiner

*Primary Examiner* — Travis Hunnings
(74) *Attorney, Agent, or Firm* — Ingrassia Fisher & Lorenz PC

(57) ABSTRACT

A parking assistance system is provided for a motor vehicle, with a sensor device which is configured to measure a distance of the motor vehicle from an object and an intrinsic speed of the motor vehicle, with a warning device, which is configured to compare the measured distance with a distance threshold value and to output a warning signal if the measured distance drops below the distance threshold value. The warning device is configured to adapt the distance threshold value taking the measured intrinsic speed into account. Furthermore, a method is provided for operating a parking assistance system, a computer program, a computer-readable medium and a motor vehicle.

14 Claims, 6 Drawing Sheets

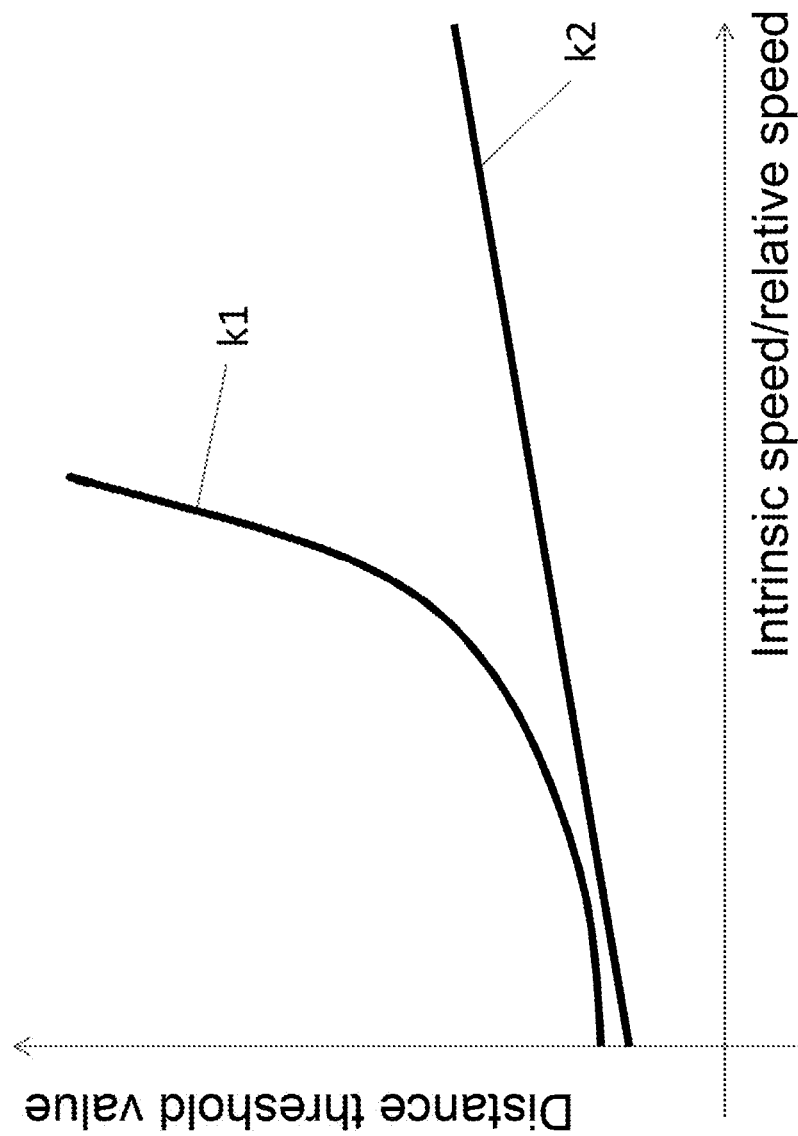

PARKING ASSISTANCE SYSTEM, METHOD FOR OPERATING A PARKING ASSISTANCE SYSTEM, COMPUTER PROGRAM, COMPUTER-READABLE MEDIUM AND MOTOR VEHICLE

CROSS-REFERENCE TO RELATED APPLICATION

This application claims priority to German Patent Application No. 10 2012 019 510.9, filed Oct. 5, 2012, which is incorporated herein by reference in its entirety.

TECHNICAL FIELD

The technical field relates to a parking assistance system, a method for operating a parking assistance system, a computer program, a computer-readable medium and a motor vehicle.

BACKGROUND

Parking assistance systems are devices or systems intended to facilitate parking of a motor vehicle. Such parking assistance systems exist in many different forms, as briefly described in the following. With parking assistance systems the distance of a motor vehicle from an object is ascertained with acoustic or electromagnetic waves, and this is then indicated acoustically and/or optically to the driver.

The purely acoustic version indicates the distance by modulating the frequency of the warning tones (tone pitch), i.e., the frequency continues to increase until a continuous tone is emitted, which is understood as signaling a very small distance. Alternatively the interval frequency can be used. Optically operating systems use LED lights, a diagram on the screen or a camera picture to indicate the approach to an object. In addition, when distances are short and the warning tones increase until a continuous tone is emitted, these LEDs can warn of an imminent collision. Also, there exist parking assistants, which fully automatically perform the parking maneuvers necessary for maneuvering the car into the parked position.

DE 10 2009 058 544 A1 describes a well-known method for operating a driver assistance system for supporting the driver during the parking maneuver. Here the distance to an object ahead of the vehicle is recorded and the recorded distance is output optically and/or acoustically to the driver of the vehicle. The recorded distance to the object is determined more precisely in the immediate vicinity of the vehicle with a recorded turning movement of at least one vehicle wheel. Admittedly this driver assistance system is very precise in recording the distance to an object. But even here it may happen that the driver is warned too early or too late.

Against this background it is at least one to provide an improved parking assistance system. In addition, other objects, desirable features and characteristics will become apparent from the subsequent summary and detailed description, and the appended claims, taken in conjunction with the accompanying drawings and this background.

SUMMARY

A parking assistance system is provided for a motor vehicle with a sensor device configured to measure a distance of the motor vehicle from an object and an intrinsic speed of the motor vehicle, with a warning device configured to compare the measured distance with a distance threshold value to output a warning signal if the measured distance drops below the distance threshold value, and to adapt the distance threshold value taking the measured intrinsic speed into account.

A method for operating a parking assistance system is provided for a motor vehicle comprising: measuring a distance of the motor vehicle from an object and an intrinsic speed of the motor vehicle; adapting a specified distance threshold value taking the ascertained intrinsic speed into account; comparing the measured distance with a specified distance threshold value; and outputting a warning signal if the measured distance drops below the adapted distance threshold value.

A computer program is provided that comprises instructions for causing a program-controlled device to execute a method. A computer-readable medium is also provided comprising a computer program. A motor vehicle is also provided comprising a parking assistance system.

The knowledge on which the embodiments are based includes the warning issued to the driver of the motor vehicle is improved by adapting the distance threshold value and/or the distance scale taking the intrinsic speed of the motor vehicle into account. The driver is given an optimal warning depending on his particular driving habit. In this way both comfort and safety of the vehicle occupants is improved and the parking maneuver is performed at a faster rate. Since existing systems can be employed at any rate for such a parking assistance system, and the modifications required for such systems are small scale, the parking assistance system is implemented in a particularly cost-effective way.

In one embodiment the warning device comprises a computing device that ascertains a relative speed of the motor vehicle in relation to the object from the measured intrinsic speed and the measured distance. The warning device is configured to adapt the distance threshold value taking into account the measured relative speed of the motor vehicle in relation to the object. In this way it is possible for the warning issued to the driver to be even more precise. For example the sensor device detects that the object, for example another motor vehicle, is moving so that the relative speed between the moving object and the motor vehicle can be utilized for adapting the distance threshold value. This further development of the parking assistance system increases comfort and safety of the vehicle occupants.

With a further embodiment the warning device is configured to raise the distance threshold value in line with the increase in intrinsic speed and/or relative speed. For example, if a previously fixed intrinsic speed, e.g., about 5 km/h, about 10 km/h, about 20 km/h etc. is exceeded, the distance threshold value is increased by previously fixed values or distance intervals, e.g., by about 10 cm, about 50 cm, about 75 cm, about 1 m, about 2 m, about 3 m, about 4 m, about 5 m, etc. In this way the parking assistance system can be especially easily configured thereby distinctly lowering the manufacturing cost for the parking assistance system. Furthermore the distance threshold value can be very quickly adapted to the intrinsic speed because there is no need for complicated computing processes in order to adapt the distance threshold value.

With a further embodiment the warning device is configured to adapt the distance threshold value in dependence of a linear or squared function of the intrinsic speed and/or the relative speed. For example, the intrinsic speed and/or the relative speed could be multiplied with a factor between about 0.1 and about 10 and added to a specified fixed distance threshold value. It is also feasible to adapt the distance threshold value in dependence of a squared function of the intrinsic speed and/or the relative speed. In this was the distance threshold value can be adapted very precisely and dynamically to the respective conditions. Moreover other suitable functions (e.g., a linear function with an offset etc.) are conceivable.

With a further embodiment, if there is a drop below the distance threshold value, the warning device is configured to activate further function groups of the motor vehicle. If there is a drop below the distance threshold value, a collision of the vehicle with the object or obstacle is a possible scenario or in the worst case is impossible to avoid. In this case it is very advantageous in view of the safety of the occupants if occupant-protective measures can be initiated at an early stage, i.e., without any further delay, preferably prior to an imminent collision and immediately there is a drop below the distance threshold value. Here, for example, active and/or passive safety components could be activated. For example, provision could be made for the warning system to automatically and autonomously engage with the control of the vehicle and activate the braking system of the vehicle, for example. This could lead to prevention of a collision or at least reduce the consequences of a collision. Additionally or alternatively provision could be made for activating the seat belt system in order to tighten the seat belts of the vehicle occupants. Additionally or alternatively provision could be made for the lighting system, a loudspeaker and/or the infotainment system of the motor vehicle to be activated in order to acoustically or optically warn the driver.

With a further embodiment the warning device is configured to adapt the distance threshold value taking an ascertained response latency of the vehicle driver into account. This could be done, using for example empirical values such as by measuring the duration of time which passes between issuing the warning signal and operating the brake pedal. This design is used to further increase the safety and comfort of the vehicle occupants.

With a further embodiment the sensor device comprises a radar sensor, a Lidar sensor and/or an ultrasound sensor. These sensors are extremely well suited for determining the distance of the object from, and/or the intrinsic speed of, the motor vehicle and/or the relative speed of the motor vehicle to the object. It is of advantage if the sensor device comprises at least one long-range sensor and one short-range sensor which are aligned with the respective direction of the driving stretch to be monitored, i.e., at least in rearward and in forward driving direction. The sensor device may, however, comprise other or additional sensors which are configured to record the distance to the object, the intrinsic speed and/or the relative speed.

With one embodiment the computer-readable medium is configured as a CD, DVD, hard disc, diskette, USB memory or the like.

The above designs and further developments can be combined at random in any meaningful way. Further possible designs, further developments and implementations of the invention comprise not explicitly mentioned combinations of features of the invention, which have previously or with reference to embodiments been described. In particular the expert will add individual aspects as improvements or amendments to the respective basic embodiments.

BRIEF DESCRIPTION OF THE DRAWINGS

The present invention will hereinafter be described in conjunction with the following drawing figures, wherein like numerals denote like elements, and:

FIG. 6 shows a schematic diagram which represents the distance threshold value in relation to the intrinsic speed or relative speed.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
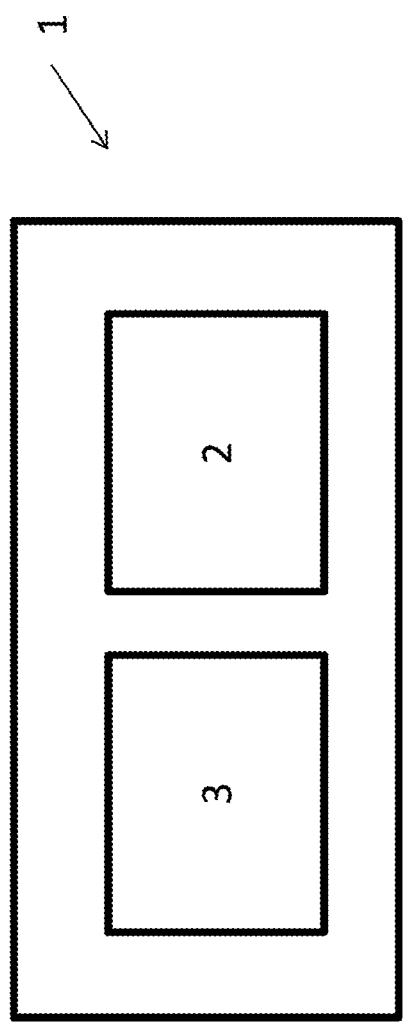
FIG. 1 shows a block diagram of the parking assistance system according to a first embodiment.

FIG. 1 shows a block diagram of a parking assistance system 1 according to a first embodiment. The parking assistance system 1 comprises a sensor device 2 that is configured to record a distance of a motor vehicle 10 from an object 70 and an intrinsic speed of the motor vehicle 10. To this end the sensor device 2 comprises an ultrasound sensor and/or a revolution sensor which are able to record the intrinsic speed and the distance of the motor vehicle from the object.

Furthermore the parking assistance system 1 comprises a warning device 3 that is configured to compare the measured distance with a distance threshold value and to output a warning signal if the measured distance drops below the distance threshold value. For example, an acoustic, optical and/or haptic signal is indicated to the user, if the measured distance drops below the distance threshold value. The warning device 3 is configured to adapt the distance threshold value taking the measured intrinsic speed into account.

Figure 2:
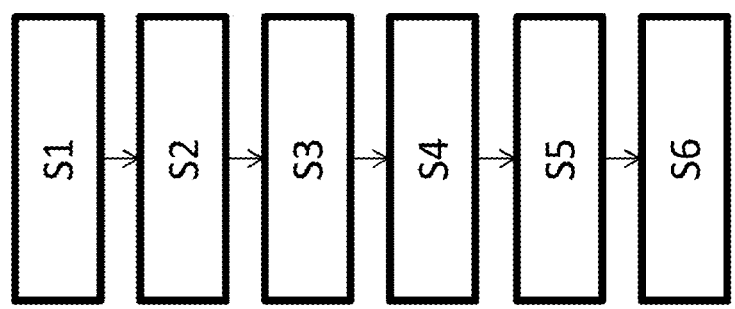
FIG. 2 shows a flow diagram of the method for operating a parking assistance system according to an embodiment.

FIG. 2 shows a flow diagram of a method for operating a parking assistance system 1 of a motor vehicle 10 according to an embodiment. In step S1 70 a distance threshold value is determined by the warning device 3. In step S2 a distance of the motor vehicle 10 in relation to an object 70 is recorded. In step S3 an intrinsic speed of the motor vehicle 10 and/or a relative speed of the motor vehicle 10 in relation to an object is ascertained. In step S4 the distance threshold value is adapted taking into account the intrinsic speed of the motor vehicle 10 as recorded in step S3 and/or the ascertained relative speed of the motor vehicle 10 in relation to the object 70. In step S5 the ascertained distance is compared with the distance threshold value which was adapted taking the intrinsic speed of the motor vehicle 10 and/or the relative speed into account. In step S6 a warning signal is output if the distance ascertained by the sensor device 2 drops below the distance threshold value.

Figure 3:
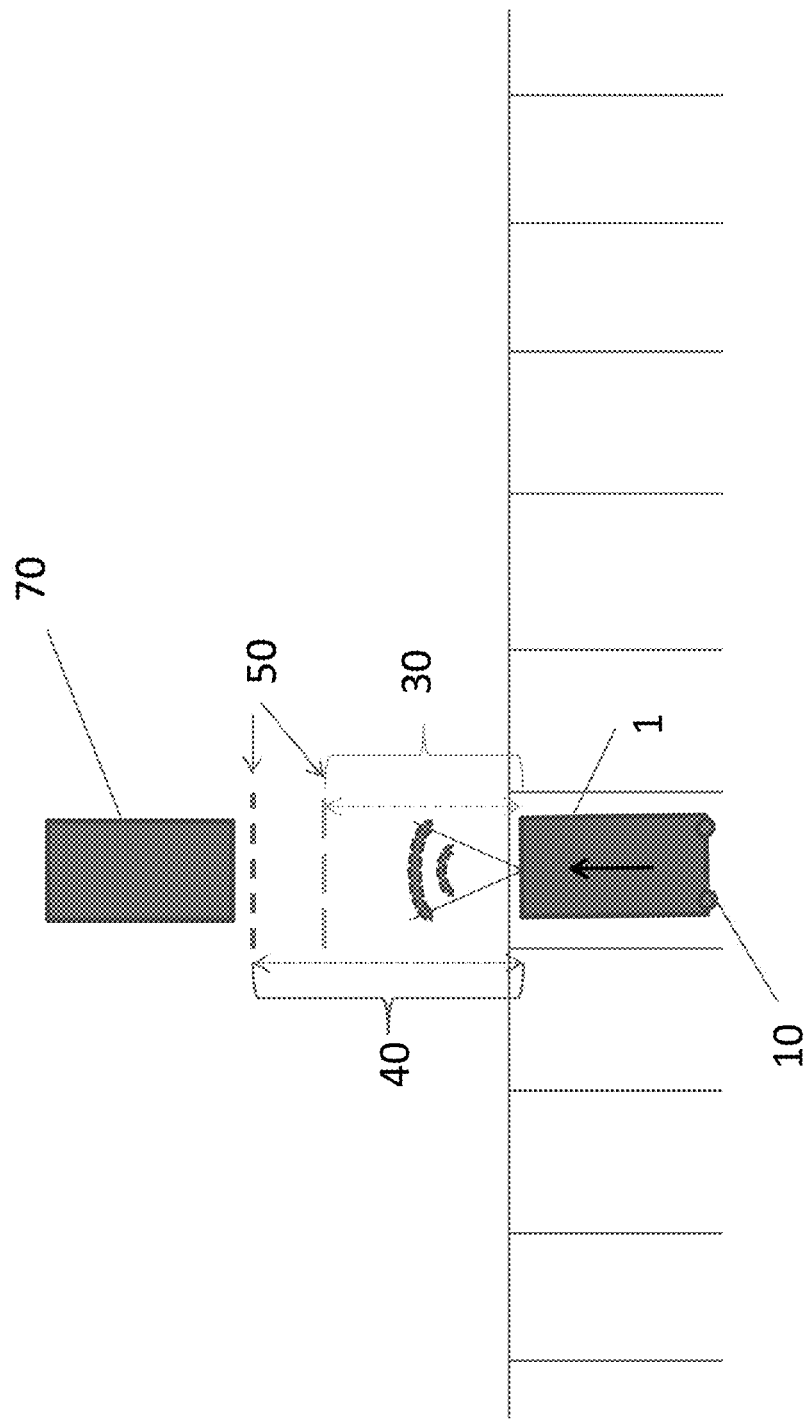
FIG. 3 shows a first schematic top view of a motor vehicle during a parking maneuver.

FIG. 3 shows a first schematic top view of a motor vehicle 10 during a parking operation. The motor vehicle 10 comprises a parking assistance system 1. The sensor device 2 of the parking assistance system 1 is configured to ascertain the distance of the motor vehicle 10 to an object 70. Furthermore the sensor device 2 is configured to ascertain the intrinsic speed of the motor vehicle 10. The warning device 3 of the parking assistance system 1 is configured to adapt the distance threshold value 50 in dependence of the ascertained intrinsic speed. The distance threshold value 50 is therefore controlled taking the intrinsic speed into account.

For example, the distance threshold value 50 is set higher as the intrinsic speed of the motor vehicle 10 increases. For example, the distance 40 represents the distance threshold value 50 if the motor vehicle 10 moves at a high intrinsic speed. The distance 30 for example represents the distance threshold value 50 if the motor vehicle 10 moves at a low intrinsic speed.

Figure 4:
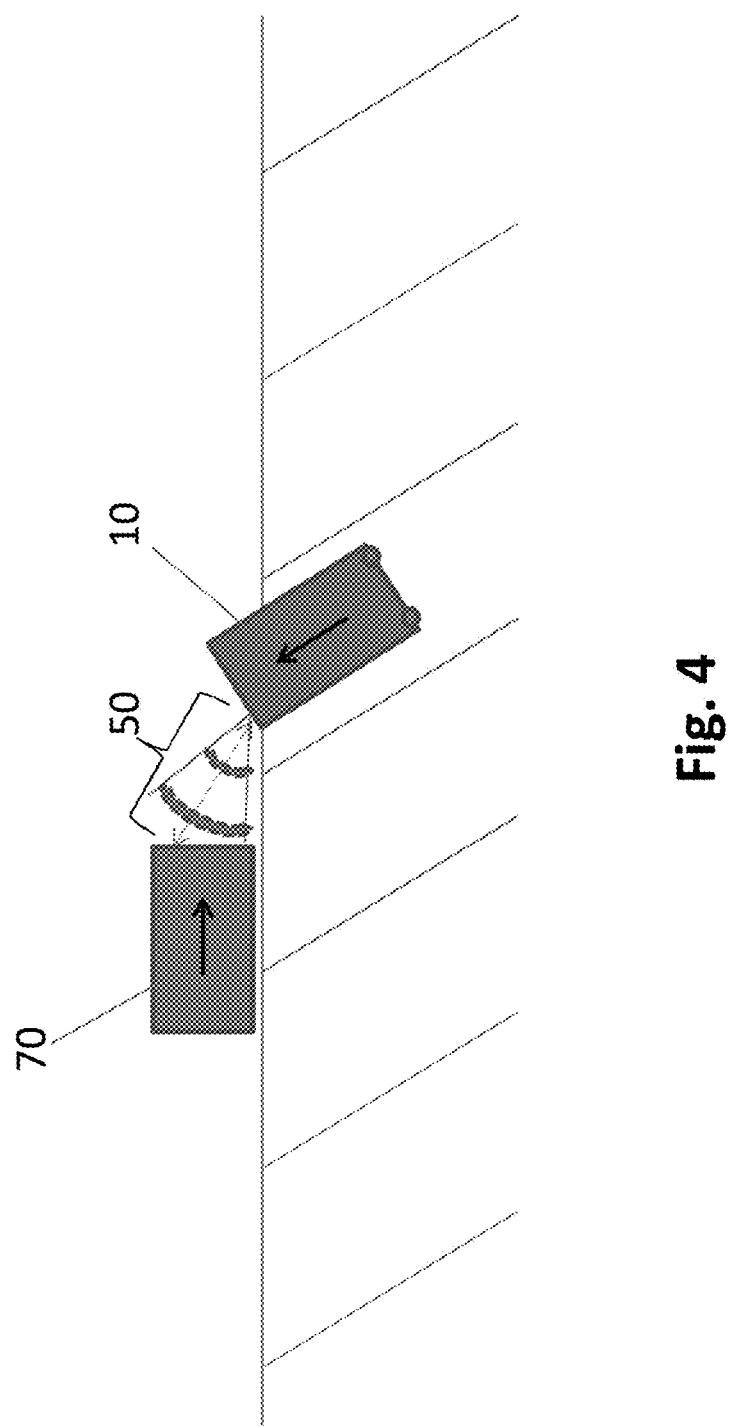
FIG. 4 shows a second schematic top view of a motor vehicle during a parking maneuver.

FIG. 4 shows a second schematic top view of a motor vehicle 10 during a parking operation. Here the parking assistance system 1 is configured such that it is able to ascertain the relative speed of the motor vehicle 10 in relation to an object 70 such as another motor vehicle. The distance threshold value at which a warning signal starts to be output to the driver of the motor vehicle 10 is adapted here taking the ascertained relative speed into account. The parking assistance system 1 is configured in such a way that it always records the minimum distance of the motor vehicle in relation to the object 70.

Figure 5:
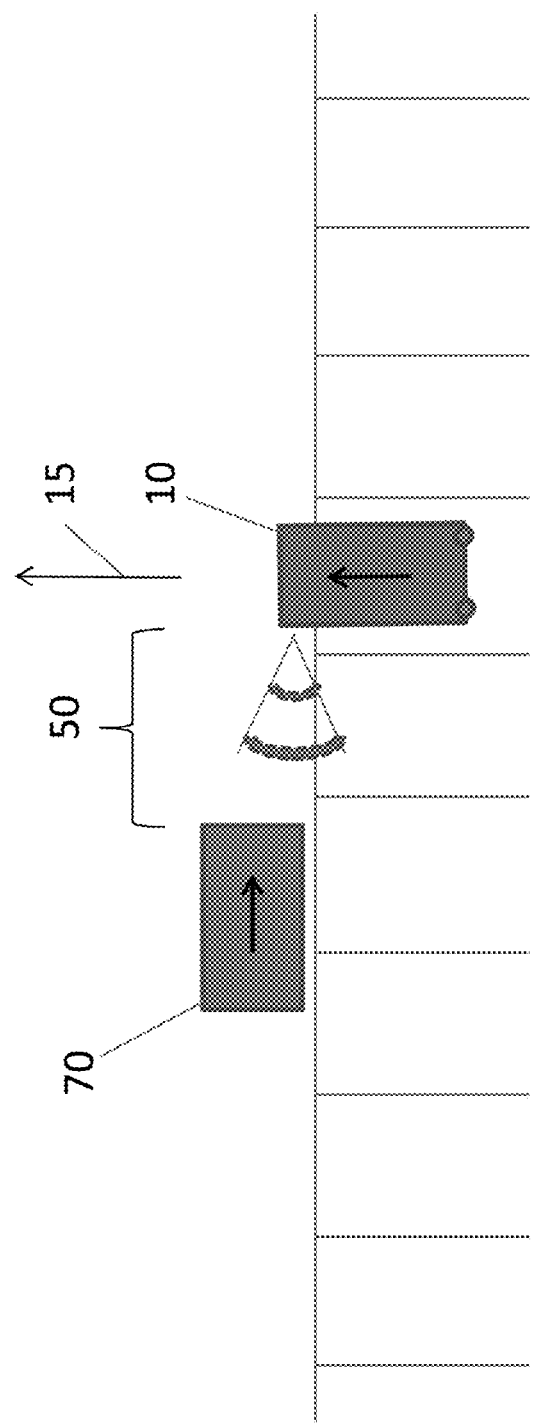
FIG. 5 shows a third schematic top view of a motor vehicle during a parking maneuver.

FIG. 5 shows a third schematic top view of a motor vehicle 10 during a parking operation. Here the object 70 such as another vehicle moves transversely to the driving direction 15 of the motor vehicle 10. The parking assistance system 1 is integrated with the motor vehicle 10 and records the relative speed of the motor vehicle 10 in relation to the object 70. The distance threshold value here is adapted taking the relative speed into account.

FIG. 6 shows a schematic diagram which represents the distance threshold value in relation to the intrinsic speed or relative speed. In this diagram no values are indicated, since it merely serves to illustrate the operation of the parking assistance system. The vertically shown axis represents the distance threshold value the horizontal axis represents the intrinsic speed of the motor vehicle and/or the relative speed of the motor vehicle. The graph 1 represents the dependence of the distance threshold value from the intrinsic speed or relative speed. It can be recognized that the distance threshold value is roughly a squared function of the intrinsic speed and/or relative speed. The graph k2 corresponds to a linear correlation between distance threshold value and intrinsic speed and/or relative speed.

Although the present invention has been described above with reference to preferred exemplary embodiments, it is not limited thereto but can be modified in many different ways. In particular the user of the parking assistance system, with the aid of a man-machine-interface, can manually set the dependence of the distance threshold value from the intrinsic speed and/or the relative speed. For example, the user can set different dependencies for the intrinsic speed and for the relative speed. For example, the user can determine that the distance threshold value has a linear dependence from the intrinsic speed and a squared dependence from the relative speed.

The following further embodiments are envisaged: a device for executing a method for operating a parking assistance system for a motor vehicle; with a measuring device for measuring a distance of the motor vehicle from an object and an intrinsic speed of the motor vehicle; with a device for adapting a specified distance threshold value taking the ascertained intrinsic speed into account; a comparator for comparing the measured distance with a specified distance threshold value; an output device for outputting a warning signal if the measured distance drops below the adapted distance threshold value. The device with an adaptor for adapting the distance threshold value in dependence of a linear or squared function if the intrinsic speed.

What is claimed is:

1. A parking assistance system for a motor vehicle, comprising:
   a sensor device that is configured to measure a distance of the motor vehicle from an object and an intrinsic speed of the motor vehicle; and
   a warning device having a computing device, the warning device configured to:
      ascertain a relative speed of the motor vehicle in relation to the object from the measured intrinsic speed and the measured distance,
      compare the measured distance with a distance threshold value,
      output a warning signal if the measured distance drops below the distance threshold value, and
      adapt the distance threshold value taking the measured intrinsic speed and the ascertained relative speed of the motor vehicle in relation to the object into account.

2. The parking assistance system according to claim 1, wherein the warning device is further configured to set the distance threshold value higher as the measured intrinsic speed increases.

3. The parking assistance system according to claim 1, wherein the warning device is further configured to adapt the distance threshold value in dependence of a function of the intrinsic speed.

4. The parking assistance system according to claim 1, wherein the warning device is further configured to activate further function groups of the motor vehicle if there is a drop below the distance threshold value.

5. The parking assistance system according to claim 1, wherein the warning device is configured to adapt the distance threshold value taking an ascertained response latency of the vehicle driver into account.

6. The parking assistance system according to claim 1, wherein the sensor device comprises a radar sensor.

7. A method for operating a parking assistance system for a motor vehicle, comprising:
   measuring a distance of the motor vehicle from an object and an intrinsic speed of the motor vehicle;
   ascertaining a relative speed of the motor vehicle in relation to the object from the measured intrinsic speed and the measured distance;
   adapting a specified distance threshold value taking the measured intrinsic speed and the ascertained relative speed of the motor vehicle in relation to the object into account;
   comparing the measured distance with a specified distance threshold value; and
   outputting a warning signal if the measured distance drops below the adapted distance threshold value.

8. The method according to claim 7, wherein adapting the distance threshold value comprises adapting in dependence of a function of the intrinsic speed.

9. The method according to claim 7, wherein the method is executed with a parking assistance system.

10. A non-transitory computer readable medium embodying a computer program product, said computer program product comprising:
   an operating program for operating a parking assistance system for a motor vehicle, the operating program configured to:
      measure a distance of the motor vehicle from an object and an intrinsic speed of the motor vehicle;
      ascertaining a relative speed of the motor vehicle in relation to the object from the measured intrinsic speed and the measured distance;
      adapt a specified distance threshold value taking the measured intrinsic speed and the ascertained relative speed of the motor vehicle in relation to the object into account;

compare the measured distance with a specified distance threshold value; and output a warning signal if the measured distance drops below the adapted distance threshold value.

11. A motor vehicle comprising a parking assistance system according to claim 1.

12. The method according to claim 7, wherein the operating program is configured to adapt the distance threshold value comprises adapting in dependence of a function of the intrinsic speed.

13. The method according to claim 7, wherein the function is a linear function.

14. The method according to claim 7, wherein the function is a squared function.

* * * * *